US012760759B2

(12) United States Patent
Sherpa

(10) Patent No.: US 12,760,759 B2
(45) Date of Patent: Oct. 13, 2026

(54) METHODS OF INCREASING ELECTROMAGNETIC CONDUCTION WITHIN A STRUCTURAL JOINT ASSEMBLY

(71) Applicant: The Boeing Company, Arlington, VA (US)

(72) Inventor: Ang Samden Sherpa, Marysville, WA (US)

(73) Assignee: The Boeing Company, Arlington, VA (US)

(*) Notice: Subject to any disclaimer, the term of this patent is extended or adjusted under 35 U.S.C. 154(b) by 148 days.

(21) Appl. No.: 18/782,702

(22) Filed: Jul. 24, 2024

(65) Prior Publication Data

US 2026/0029010 A1 Jan. 29, 2026

(51) Int. Cl.
*F16B 33/00* (2006.01)
*B64D 45/02* (2006.01)

(52) U.S. Cl.
CPC ............ *F16B 33/004* (2013.01); *B64D 45/02* (2013.01); *F16B 2200/93* (2023.08)

(58) Field of Classification Search
CPC ..... F16B 33/004; F16B 2200/93; B64D 45/02
See application file for complete search history.

(56) References Cited

U.S. PATENT DOCUMENTS 4,755,904 A * 7/1988 Brick ...................... F16B 19/05 244/1 A
5,685,680 A * 11/1997 Duffy ...................... F16B 33/06 219/99
8,393,068 B2 * 3/2013 Keener ................. B29C 65/601 411/908
10,052,847 B2 * 8/2018 Day ....................... C09D 11/52
10,603,844 B2 * 3/2020 Khosravani ........... B29C 65/542
10,739,389 B2 * 8/2020 Khosravani .............. G01B 7/06
10,808,749 B2 10/2020 Khosravani et al.
10,982,705 B2 * 4/2021 Khosravani ............. C23C 10/30
11,137,014 B2 10/2021 Hansen et al.
11,293,474 B2 * 4/2022 Sisco ...................... F16B 33/06
(Continued)

OTHER PUBLICATIONS

Extended European Search Report for EP App. No. 25186333.8-1014, dated Dec. 17, 2025.

*Primary Examiner* — Jacob J Cigna
(74) *Attorney, Agent, or Firm* — Joseph M. Butscher; Carroll, Hoette & Butscher, LLC

(57) ABSTRACT

Methods of increasing electromagnetic energy conduction between a fastener and at least two structural elements secured together by the fastener after assembly of the fastener and structural elements, at least one of the structural elements formed as a layer of carbon fiber reinforced plastic. One method includes a) forming a first hole through a first structural element and a second hole through a second structural element, each of the holes being formed to align with the other; b) melting and applying a conductive gap filler to sidewalls of the holes; c) installing a shank portion of the fastener through the first and second holes to complete assembly; and d) after assembly, applying heat to the fastener and gap filler to remelt and reflow the conductive gap filler. Another method involves applying a conductive coating to the shank portion in lieu of applying conductive gap filler to sidewalls of the holes.

20 Claims, 10 Drawing Sheets

(56) References Cited

U.S. PATENT DOCUMENTS

| | | | | |
|---|---|---|---|---|
| 11,303,047 | B2 | 4/2022 | Hansen et al. | |
| 12,303,939 | B2 * | 5/2025 | Pham | F16B 5/02 |
| 2005/0200136 | A1 * | 9/2005 | Aisenbrey | H05K 3/101 292/1 |
| 2016/0229552 | A1 * | 8/2016 | Gross | F16B 1/00 |
| 2021/0210873 | A1 | 7/2021 | Hansen | |

* cited by examiner

METHODS OF INCREASING ELECTROMAGNETIC CONDUCTION WITHIN A STRUCTURAL JOINT ASSEMBLY

TECHNICAL FIELD

This disclosure relates to methods of increasing electromagnetic energy (EME) conduction within structural joint assemblies, and more specifically to methods for creating fastening systems that have enhanced EME conduction.

Methods of enhancing EME conduction in fastening systems utilizing metallic fasteners inserted through two or more structural elements, at least one of which is made of a composite material, such as carbon fiber reinforced plastic ("CFRP"), are disclosed. Fasteners are employed to secure structural elements together via methods designed to enhance EME conduction between the fasteners and carbon fibers within the CFRP.

BACKGROUND

Lightweight composite materials, such as CFRP, are routinely employed in major structural components of modern commercial aircraft. Composite materials offer significant advantages in strength and durability over conventional metal alloys.

In addition, because composite materials tend to weigh less than conventional metal alloys, fuel savings and lower operating costs can be realized. Beyond such attributes, composites are more resistant to corrosion and fatigue than conventional metal alloys.

CFRP comprises a material matrix that includes a plastic resin which acts to bind together fibrous materials, such as carbon fibers. Structural elements formed of such matrices are fabricated in the form of layers. The layers are secured together by metallic fasteners that produce stacks of CFRP. The fasteners are inserted through holes punched, reamed, or otherwise formed through the layers.

The fasteners, formed of aluminum alloys, including titanium, may be a rivet, a bolt, or a pin, and may often include a mating part such as a nut or a collar.

Metallic fasteners are well known to be electrically conductive, which raises considerations of electromagnetic energy (EME) management for aircraft. Because electric currents travel through structural joints of aircraft, the fasteners must be able to accommodate lightning strikes, since structural elements containing fasteners must include suitable pathways for electric current. Because only the carbon fibers within the CFRP matrix are electrically conductive, CFRP materials are known to possess greater resistance to EME flows, than traditional metal alloys. Also, drilling holes for installing fasteners within CFRP material adds to the existing material resistance due to crevices and peaks of rough surfaces in sidewalls of the holes created by the drilling. The crevices in the sidewalls result in gaps between the holes and the fasteners, which can produce undesirable discontinuities in flows of electric current passing between engaging surfaces of the metallic fastener and the CFRP material.

As a result, upon lightning strikes of CFRP assemblies containing metallic fasteners, any poor conduction between CFRP material and associated fasteners may impede current flows, which may instantaneously increase current densities and create heat spikes and thermal decomposition in surrounding CFRP materials. This can result in a phenomenon called hot particle ejection (HPE), under which particles, including fasteners, can be ejected from affected structures. As a result, aircraft structures must be designed to manage lightning strikes, including HPE and its associated effects.

Common solutions have involved actively managed interference fits to provide increased levels of fastener and carbon fiber contact. Such solutions have, however, often involved considerable expense.

It is therefore desirable to provide more economical methods of designing CFRP fastening systems to successfully overcome EME conduction issues.

SUMMARY

In one aspect, a method of increasing EME conduction between a fastener and at least two structural elements secured together by the fastener after assembly of the fastener and the structural elements is disclosed. The fastener includes a shank, and at least one of the structural elements is also formed of carbon fiber reinforced plastic. The method includes a) forming a first hole through the first structural element and a second hole through the second structural element, each of the holes being formed to align with the other; b) applying a conductive gap filler to the sidewalls of each of the holes; c) installing the shank portion of the fastener through the first and second holes to complete the assembly; and d) after the assembly, applying heat to the fastener and the conductive gap filler sufficient to melt and reflow the conductive gap filler.

In another aspect, a method of increasing EME conduction between a fastener and at least two structural elements secured together by the fastener after assembly of the fastener and the structural elements is disclosed. The fastener includes a shank, and at least one of the structural elements is also formed of carbon fiber reinforced plastic. The method includes a) forming a first hole through the first structural element and a second hole through the second structural element, with each of the holes being formed to align with the other, and each of the holes defining sidewalls; b) applying a conductive coating to the shank portion of the fastener to form a coated shank portion; c) installing the coated shank portion of the fastener through the first and second holes to complete the assembly; and d) after the assembly, applying heat to the fastener sufficient to remelt and reflow the conductive coating.

In yet another aspect, a method of increasing EME conduction between a fastener and at least two structural elements secured together by the fastener after assembly of the fastener and the structural elements is disclosed. The fastener includes a shank, and at least one of the structural elements is also formed of carbon fiber reinforced plastic. The fastener also includes a cylindrical sleeve having an interior portion frictionally fixed to the shank. The method includes a) forming a first hole through the first structural element and a second hole through the second element, each of the holes being formed to align with the other, each of the holes defining sidewalls; b) applying a conductive coating to an exterior portion of the sleeve; c) installing the sleeve and shank portions of the fastener through the first and second holes to complete the assembly; and d) after assembly, applying heat to the fastener sufficient to remelt and reflow the conductive coating.

Additional aspects and advantages of the methods disclosed herein, effective to enhance conduction by reducing any voids in conductive gap fillers and/or coatings applied between fastener and structural elements after the latter components have been assembled together, may be further appreciated via examples provided herein, and yet other examples, as better appreciated with reference to the following description and drawings.

DETAILED DESCRIPTION

Figure 1:
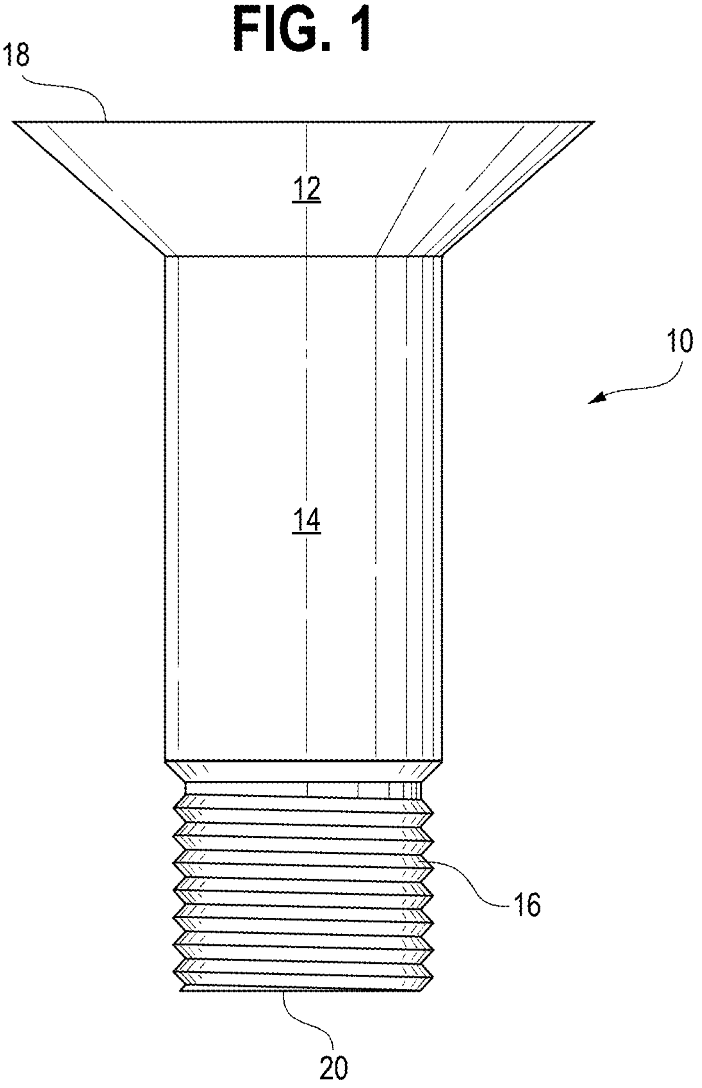
FIG. 1 is an elevational view of an exemplary fastener that may be employed in accordance with a method of this disclosure.

FIG. 1 depicts an exemplary fastener 10 suitable for use with at least one method of this disclosure for increasing EME conduction of aircraft and/or other structural elements secured together by fasteners. The fastener 10 has a head 12, a shank portion 14, and a threaded end 16. The head 12 defines a first or top extremity 18, and a second or bottom extremity 20.

The fastener 10 may be constructed of metallic materials, such as titanium, stainless steel, aluminum, and combinations or alloys thereof. A nut 60 (FIG. 4) containing an internal thread (not shown) mates with the threaded end 16 (FIG. 1), and cooperates with the head 12 to secure at least a pair structural elements 30, 40 together, as described below.

As used herein, the term "fastener" 10 includes but is not limited to any type of bolts, pins, rivets, and/or any other suitable devices for fastening structural elements together. The term nut 60 includes any internally threaded nut that can be described as a "mating part" capable of engaging with the fastener 10. Although in FIG. 1, the fastener 10 is displayed and disclosed as a rivet containing a threaded end for engagement with the nut 60, the concepts disclosed herein may have applicability within other contexts, such as when the fastener 10 may comprise a bolt or pin, and the mating part may comprise a collar, whether or not swaged, that engages with the threaded end 16 of the pin.

Figure 2:
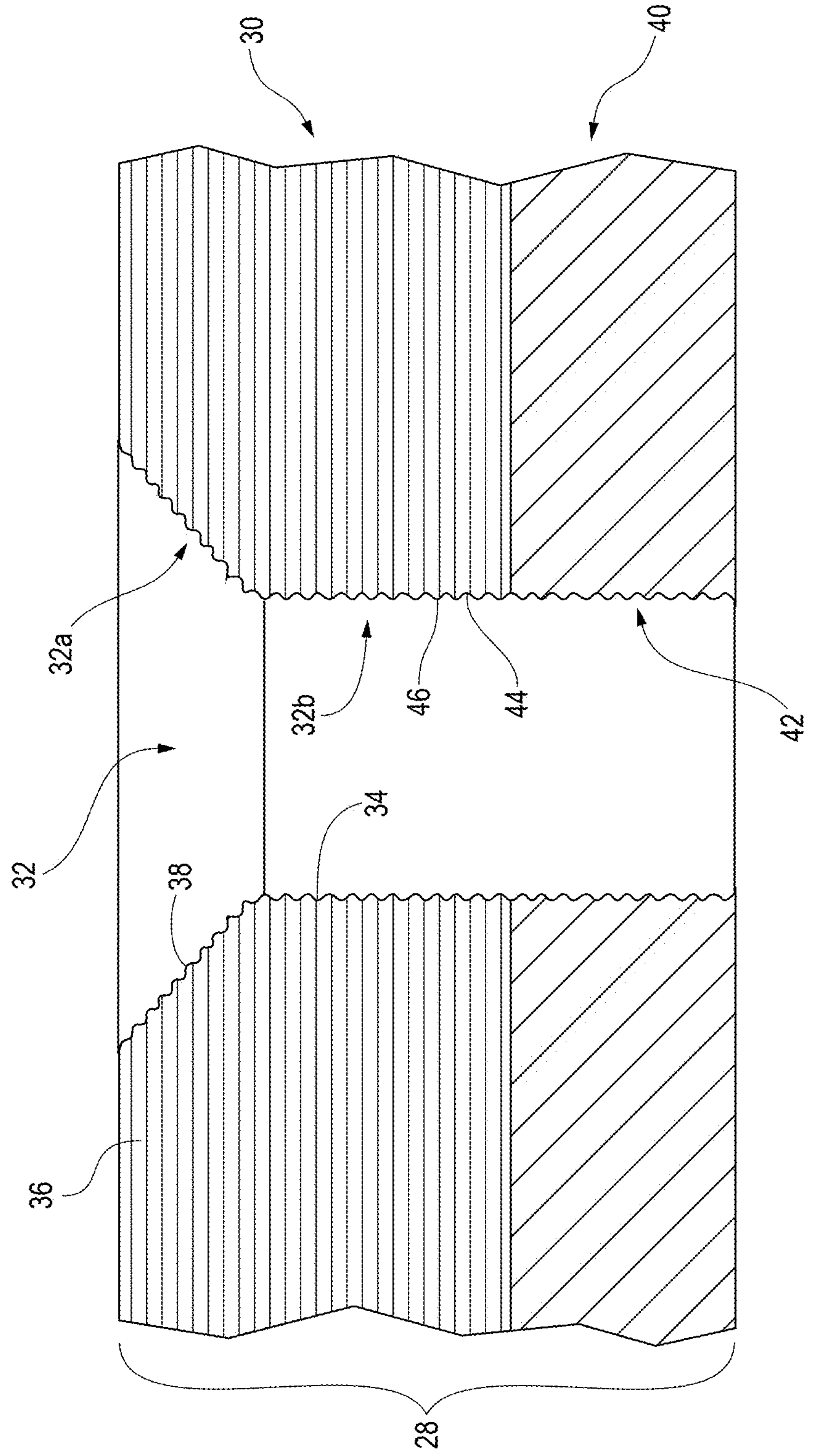
FIG. 2 is a cross-sectional view of a pair of layers, shown prior to fastening, which may be fastened together to form a stack in accordance with a method of this disclosure.

Referring to now primarily to FIG. 2, a completed structural assembly 70 (FIG. 4) is initiated by layering together two or more structural elements 30 and 40 (FIG. 2), creating a so-called stack of parallel layers 28. The first structural element 30, typically presenting an outwardly facing surface, is disclosed herein as a composite layer. As such, the composite layer is formed of a carbon fiber reinforced plastic CFRP material, a matrix material, such as a plastic resin 36 and a plurality of carbon fibers 38 supported by and extending through the matrix material. Other composite materials may be used in lieu of the plastic resin, such as a thermosetting polymer resin, e.g., an epoxy. The carbon fibers 38 of the CFRP could also be replaced with other types of electrically conductive materials, as may be appreciated by those skilled in the art.

Such structural assemblies 70 (FIG. 4) are often formed of CFRP stacks or CFRP-metallic hybrid stacks. Various assemblies 70 have had application among a wide range of industries, including formation of aircraft structures such as side-body joints, wing structures, and fuselage components, and other applications not limited to aircraft structures.

Continuing reference to FIG. 2, the second structural element may also be a composite material such as the CFRP layer 30, but may also be a metallic material layer 40, formed of aluminum, titanium, or an alloy of those metals. In the disclosed example of FIG. 2, the stack 28 includes only the two structural layers 30 and 40. It should be appreciated that the layers 30 and 40 can be supplemented with additional layers of CFRP materials and/or metallic materials.

As shown in FIG. 2, at least one hole is provided through each layer 30 and 40. The first hole 32 is formed through the layer 30, and is a compound hole having a tapered section 32*a* to accommodate the tapered head 12 of the fastener 10 (FIG. 1), and a straight cylindrical section 32*b* configured to accommodate the shank 14 of the fastener. The second hole 42 is cylindrical, and is formed through the metal layer 40. The holes may be drilled, reamed, or otherwise formed through the layers 30, 40 after the layers 30,40 have been assembled to form the stack 28, or may be pre-drilled through the layers prior to their assembly.

The first and second holes 32, 42 are aligned when the layers 30 and 40 have been placed together for assembly. Each of the holes is defined by a roughened sidewall 34, that may be created by the drilling or reaming process, but which, although shown roughened in FIG. 2, may optionally be formed as a smooth surface in the sidewall 34 of the hole 42 in the metal layer 40.

The roughened sidewall 34 that characterizes the hole 32 of the CFRP layer 30 presents an irregular surface containing crevices 44 and jagged edges 46 that will facilitate application of a conductive gap filler material between the fastener and the hole, as described below.

As will be appreciated by those skilled in the art, actual diameters of the respective holes 32, 42 will depend on compositions of conductive gap fillers used to construct the structural assembly 70 (FIG. 4), along with dimensions including thickness of the assembly, and geometry of fasteners employed. Also, although this disclosure references only one pair of aligned holes 32, 42, it should be appreciated that any given structural assembly 70 may contain pluralities of such holes, depending on sizes and shapes of the particular assemblies 70, and subject to desired levels of fastening for any given application.

Method Using Conductive Gap Filler

Figure 3:
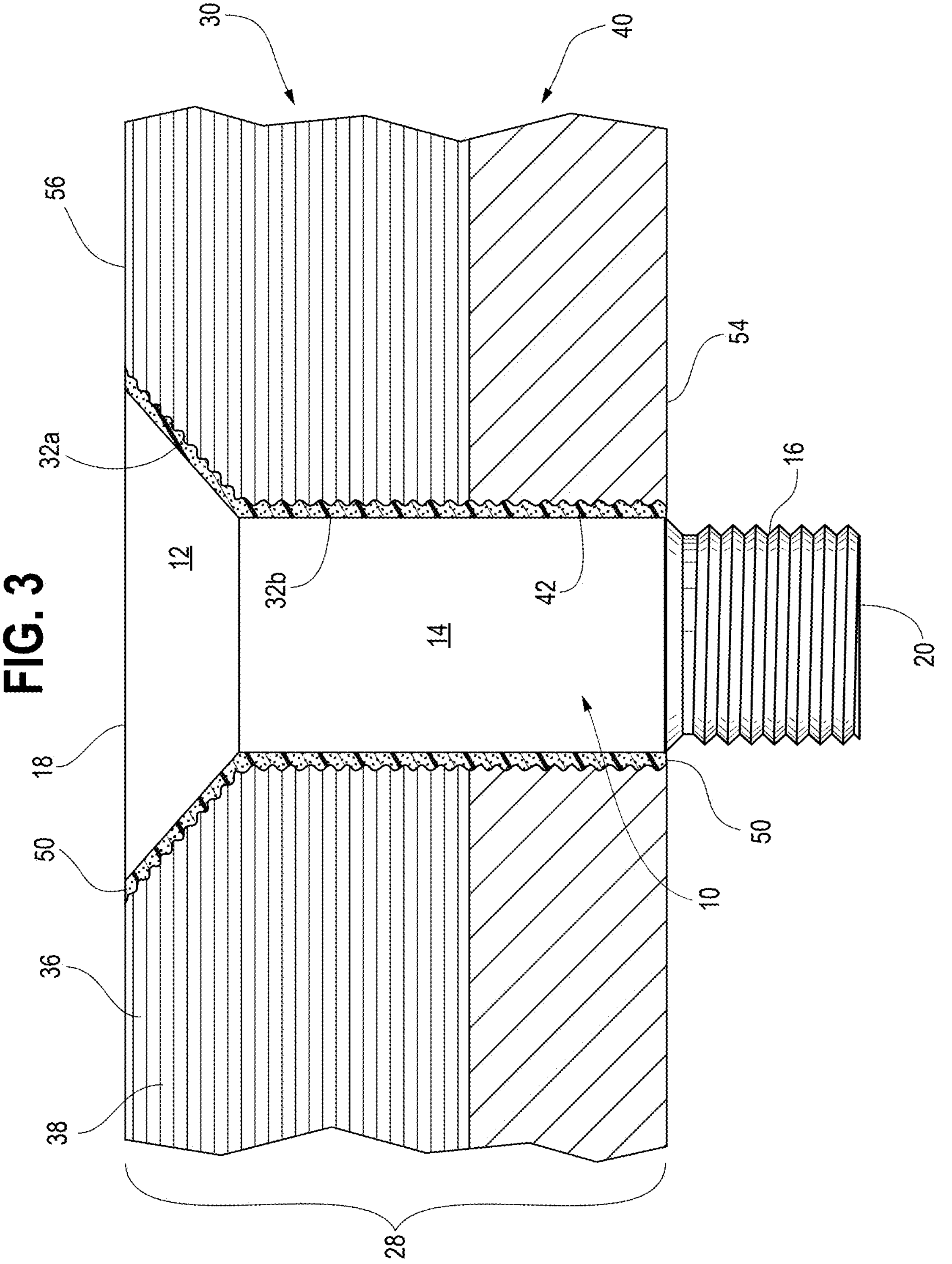
FIG. 3 is a cross-sectional view of the pair of layers of FIG. 2, shown after being fastened together with the fastener of FIG. 1, and with a conductive gap filler material applied in accordance with a method of this disclosure.
Figure 4:
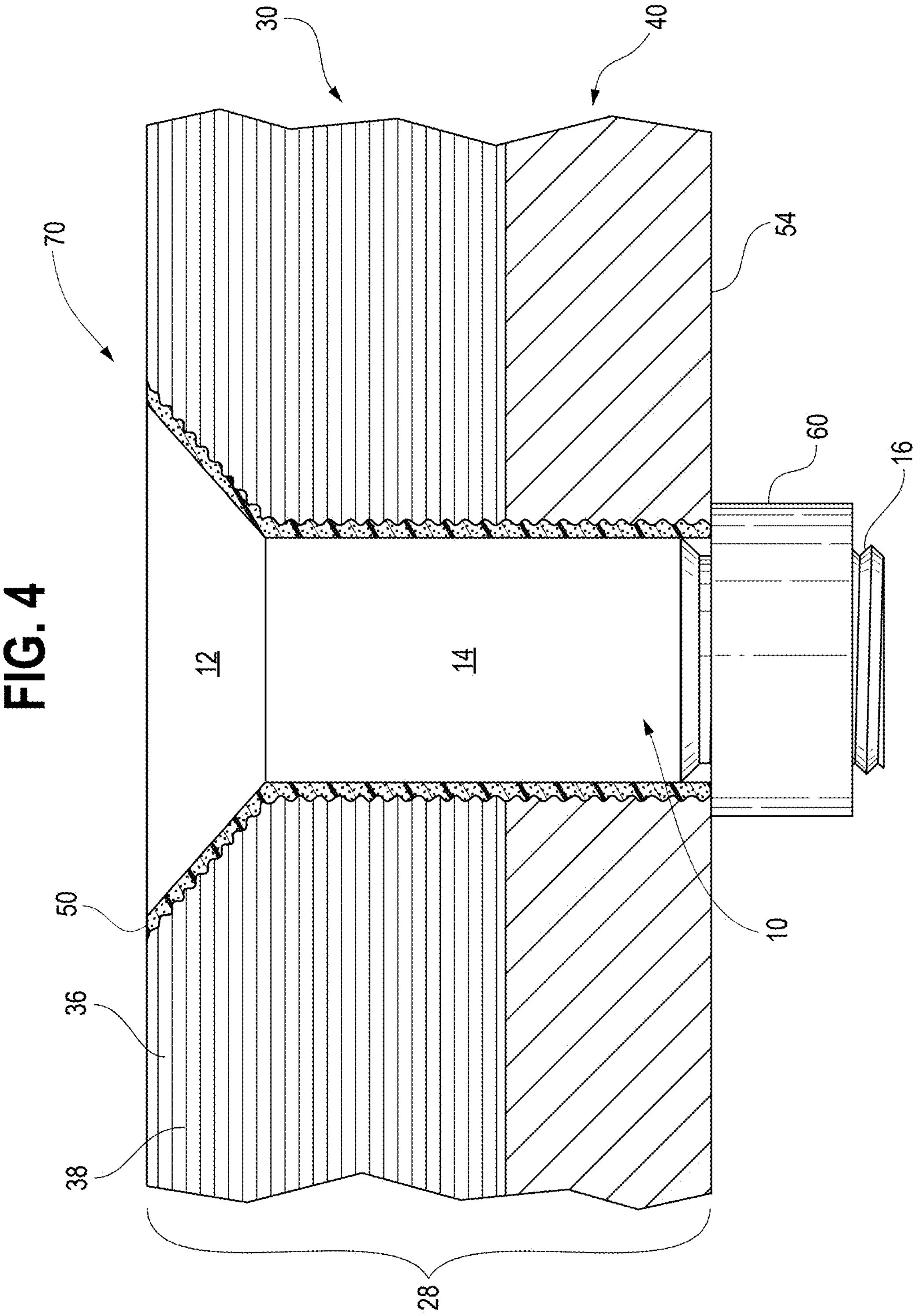
FIG. 4 is a cross-sectional view of the pair of layers of FIG. 3, shown after being fastened together with the fastener of FIG. 1, with a conductive gap filler material applied, and with a nut or collar applied to the fastener, in accordance with a method of this disclosure.
Figure 5:
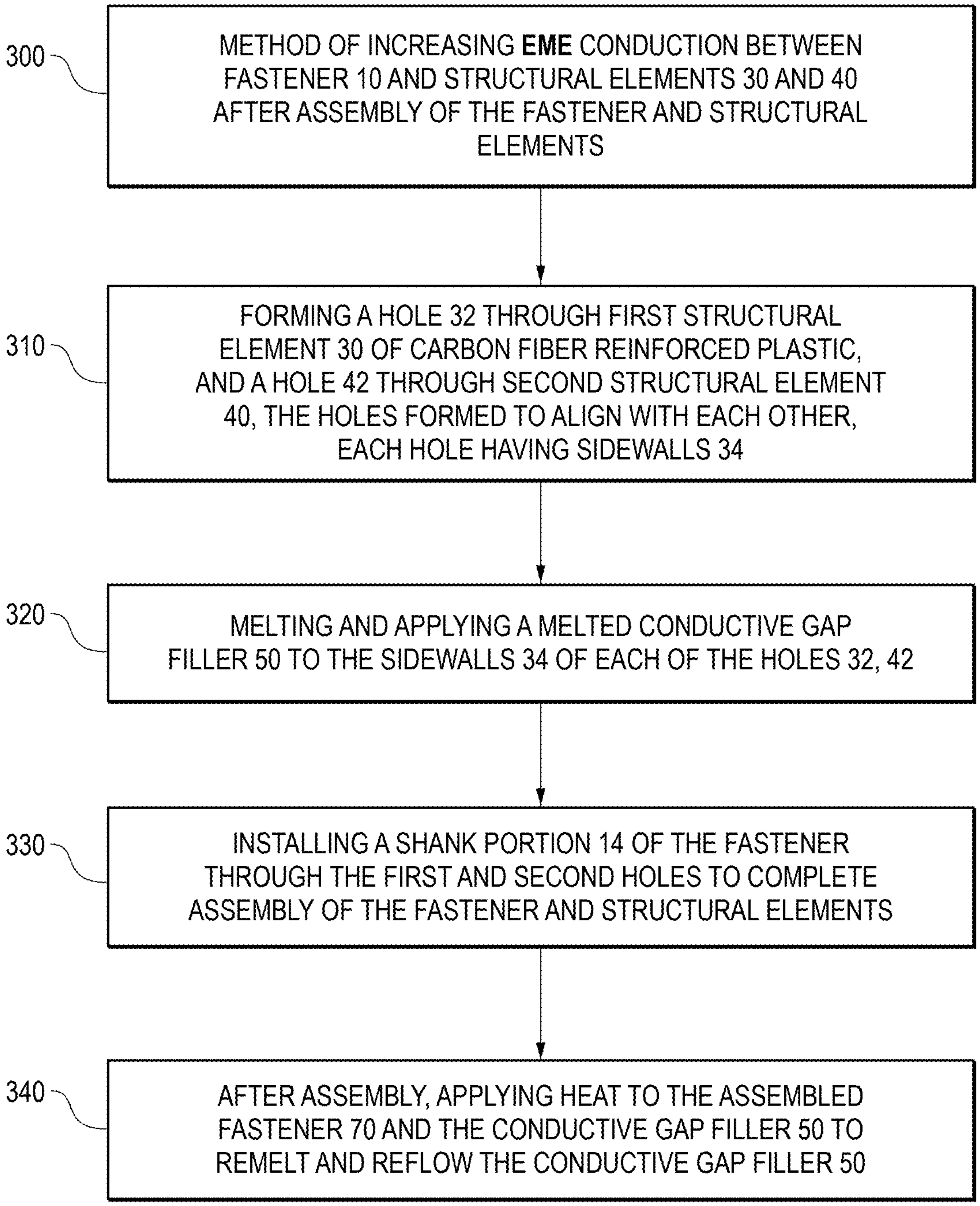
FIG. 5 is a Flowchart describing one of the disclosed methods.

Referring now to FIGS. 3 and 4, one method of forming the assembly 70 involves an application of an electrically conductive material referred to and described herein as a conductive gap filler (CGF) 50. As apparent in both FIGS. 3 and 4, the CGF 50 is situated between the fastener 10 and the holes 32, 42 of the stack 28. As such, the CGF 50 will be applied to the holes prior to insertion of the fastener 10. As will be appreciated by those skilled in the art, the CGF 50 can enhance EME conduction between the carbon fibers 38 of the CFRP and the fastener 10. In the disclosed method applicable to this embodiment, the CGF 50 is applied to the entire circumferential sidewall 34 of each hole 32, 42. Additionally, in structural assemblies 70 possessing only two layers, one formed of CFRP and the other of metal as in the examples disclosed herein, the CGF 50 may more optimally be applied only to the roughened sidewall 34 of the CFRP hole.

The CGF 50 is ideally formed of a low melting alloy ("LMA") comprised of elements compatible with desired applications, for example an aircraft component. As used herein, the term LMA is applicable to alloys having a melting temperature in a range greater than about 140° F. and less than about 400° F., preferably about 170° F. to about 400° F. LMAs suitable for use with the structural assembly 70 include alloys of two or more elements of indium, bismuth, tin, nickel and zinc (e.g. an INDALLOY as manufactured by the Indium Corporation). A preferred LMA is a ternary alloy of a mixture of bismuth (preferably more than 50%), indium and tin. Due to its softness, the LMA may perform as a solid lubricant, making insertion of the fastener 10 easier with lower insertion force but with a suitable interference fit, depending on dimensions of fastener shank and hole diameter.

Alternatively, and instead of using an LMA, the CGF 50 may consist of a pure metal such as a 100% pure indium, or the LMA may be made of any conductive alloy material having equal or greater EME conduction than the carbon fibers 38 within the CFRP material. The CGF 50 is ideally deposited within the crevices 44 of the sidewall 34 of the holes 32, 42 to create smooth conductive surfaces. As such, thickness of the CGF applied to the sidewall 34 will effectively decrease the physical diameter of the holes 32, 42.

The CGF 50 may be applied to the sidewall 34 of the holes 32, 42, as a paste, for example by abrading, or as a liquid by injection, and/or any other methods known in the art.

Referring now particularly to FIG. 4, the completed structural assembly 70 with the fastener 10 fully installed may also include a nut 60 secured on its threaded end 16. The fastener 10 is of course installed within the mated holes 32, 42 once the holes have been coated with the CGF 50. In accordance with this particular method, the fastener 10 is inserted into the holes in a manner that the shank 14 engages the CGF with a predetermined clearance, such that the threaded end 16 extends beyond a bottom extremity 54 of the second structural element 40, as shown. The nut 60 can then be installed on the fastener's threaded end 16. The layers 30 and 40 are thus secured together via the head and nut which holds the shank in tension, as produced by torqued engagement of the nut 60 against the bottom extremity 54.

In accordance with descriptions of FIGS. 1-4, FIG. 5 is a flowchart of a method 300 of increasing EME conduction between the fastener 10 and the pair of structural elements 30 and 40 after assembly of those components. The fastener includes a shank portion 14, and secures together the pair of structural elements. At least one of the pair of structural elements, e.g., 30, is formed of carbon fiber reinforced plastic. The method 300 includes a) 310: forming a first hole 32 through the first structural element 30, and a second hole 42 through the second structural element 40, each of the holes being formed to align with the other, the holes defining sidewalls 34; b) 320: melting and applying a melted conductive gap filler 50 (see FIG. 4) to the sidewalls 34 of each of the holes 32, 42; c) 330: installing the shank portion 14 of the fastener through the first and second holes to complete the assembly; and d) 340: after the assembly, applying heat to the fastener 70 and the conductive gap filler 50 to remelt and reflow the conductive gap filler 50. The method 300 reduces and/or otherwise minimizes voids and discontinuities within the conductive gap filler, thus effectively increasing EME conduction. The heat may be generated and/or applied via any suitable heating source, including induction, such as through use of induction coils applied directly to the fastener, heat gun, and resistance, as examples. The heat can be robotically applied via use of end effectors, as will be appreciated by those skilled in the art.

Example Demonstrating Proof of Principle

A process was initiated for measuring increased EME conduction gained via remelt and reflow of a conductive gap filler versus conventional use of same conductive gap filler but without the post-installation remelt and reflow process of this disclosure.

For this purpose, a carbon fiber reinforced plastic (CFRP) composite was formed having dimensions of approximately 6"×6" and having a thickness of 0.2 inches.

A hole was drilled through the center of the composite, the hole having a 0.252 diameter. An aircraft fastener, having part number B3NR4, with a shank diameter of 0.250 inch was installed within the hole after application of a conductive gap filler was applied to the sidewalls of the hole.

An adhesive conductive foil was applied to the edges of the composite for use as an electrical lead to achieve a conductivity measurement. For the measurement, a Fluke Multimeter, Model 87V, was applied to the foil once the fastener was installed into the hole. The measured resistance was 9.9 ohms.

To accomplish the remelt and reflow process, a 2500 watt ZVS induction heater coil was applied to the fastener until a temperature of 193° C. was reached. After being left to cool for 30 minutes, the measured resistance was 5.8 ohms thus exhibiting a reduction of 4.1 ohms.

Method Using Conductive Coating

Figure 6:
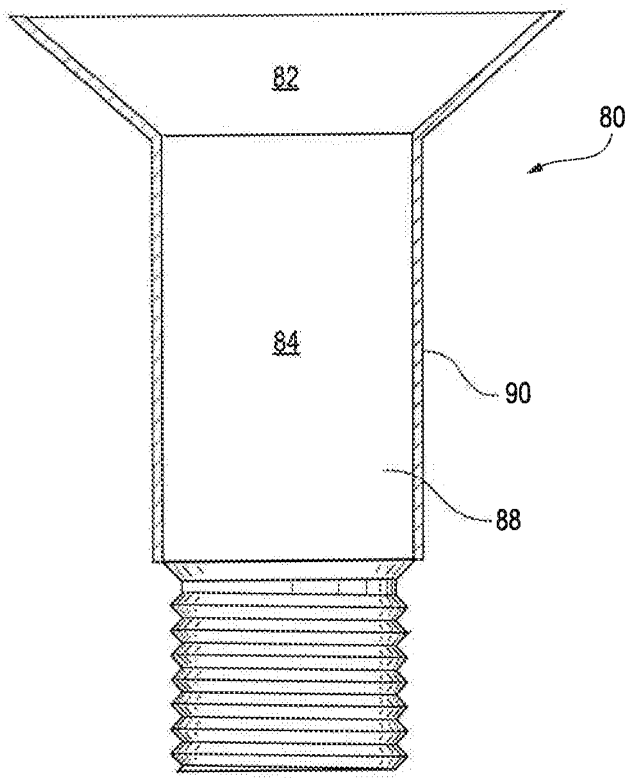
FIG. 6 is an alternate embodiment of a fastener constructed in accordance with a method of this disclosure.

Another method of achieving improved EME performance utilizes an alternate fastener embodiment, i.e., fastener 80 in FIG. 6, to increase electrical conduction between the fastener and carbon fibers 38 within the CFRP layer 30. Thus, in lieu of a CGF applied as in the first described method, a conductive coating 90 is applied to the circumferential head and shank portions 82 and 84, respectively, of the fastener 80. The conductive coating 90 can be remelted after insertion of the fastener to provide an equivalent level of increased EME conduction between the fastener and the carbon fibers, as achieved using the CGF method.

The conductive coating 90 can be LMA, which has a melting temperature range of 140° F. to 400° F. One example of such LMA is a tin-zinc-bismuth alloy made up of approximately 65% tin and 32-33% zinc, with 2-3% bismuth. A non-LMA example of the conductive coating 90 would be 100% pure indium, which has a melting temperature of 313° F.

The conductive coating 90 can be applied to the fastener 80 in a manner to achieve a uniform thickness, ideally on less than the entire fastener 80, such as only about the circumferential shank 84 and circumferential portion of the head 82. Application of the coating 90 can be by spraying in liquid form, or otherwise by melting and applying by any other means known to those skilled in the art. The thickness of the conductive coating 90 may be determined based on factors such as the coating composition applied, along with size and geometry of the structural assembly 70.

The conductive coating 90 will have a melting temperature lower than any maximum temperature expected to be experienced by the CFRP in the structural assembly 70 during operation of an aircraft, as well as during any finish curing process.

Figure 7:
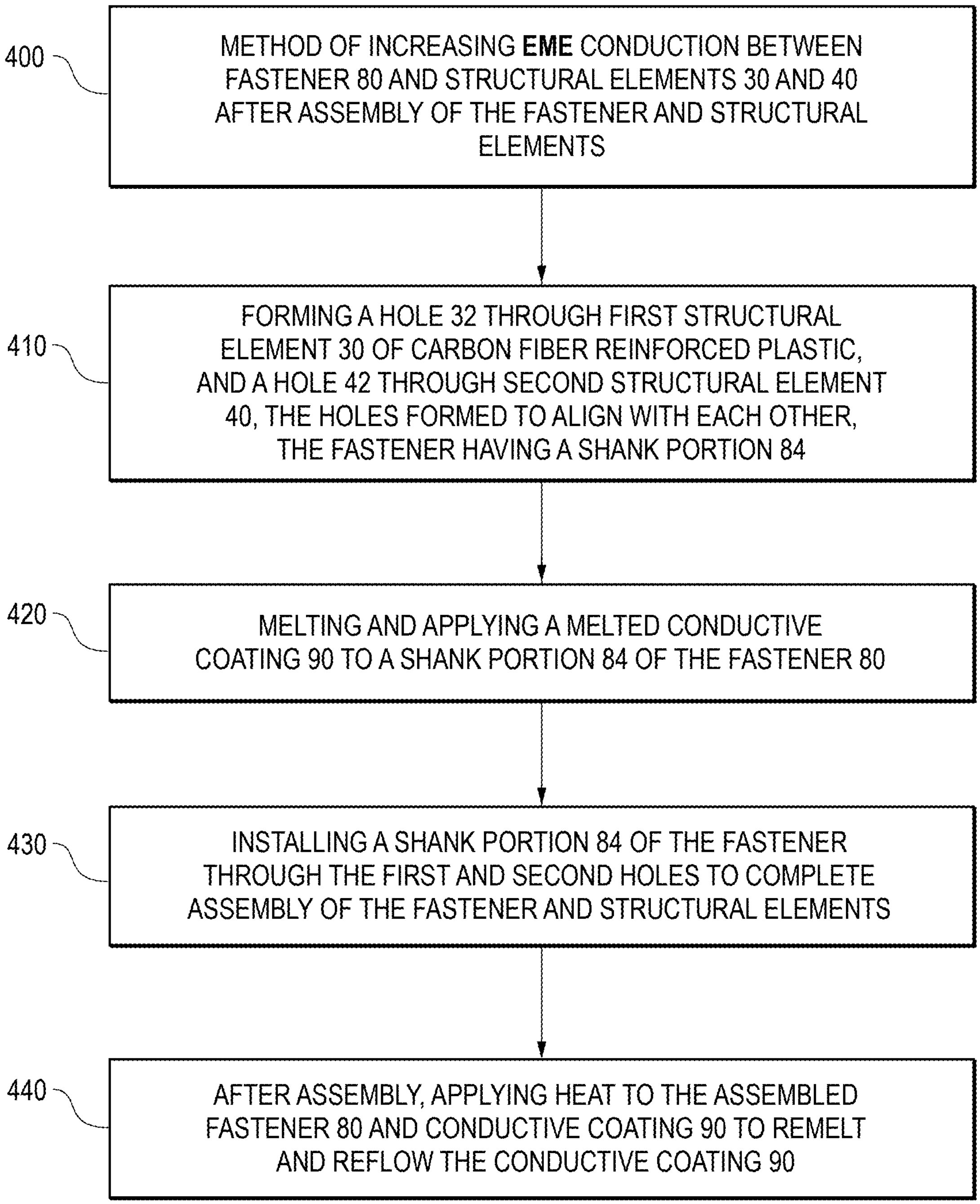
FIG. 7 is a second Flowchart describing another of the disclosed methods.

In accordance with the description of FIG. 6, FIG. 7 is a flowchart depicting a method 400 of increasing EME conduction between the described coated fastener 80 including the shank portion 84 (FIG. 6) and the pair of structural elements 30, 40 (FIG. 2) after assembly of those components, that includes applying the fastener to the pair of structural elements, at least one of which is formed of carbon fiber reinforced plastic. The method 400 includes: a) 410: forming a first hole 32 through the first structural element 30, and a second hole 42 through the second structural element 40, each of the holes being formed to align with the other, each of the holes defining sidewalls 34; b) 420: melting and applying a conductive coating 90 to the shank portion 84 of the fastener to form a coated shank portion 88; c) 430: installing the coated shank portion 88 of the fastener 80 through the first and second holes to complete the assembly; and d) 440: after assembly, applying heat to the fastener 80 sufficient to remelt and reflow the conductive coating 90. This method is effective to reduce voids and discontinuities within the melted conductive coating 90, and to thereby increase EME conduction.

Methods Using Sleeved Fasteners

Figure 8:
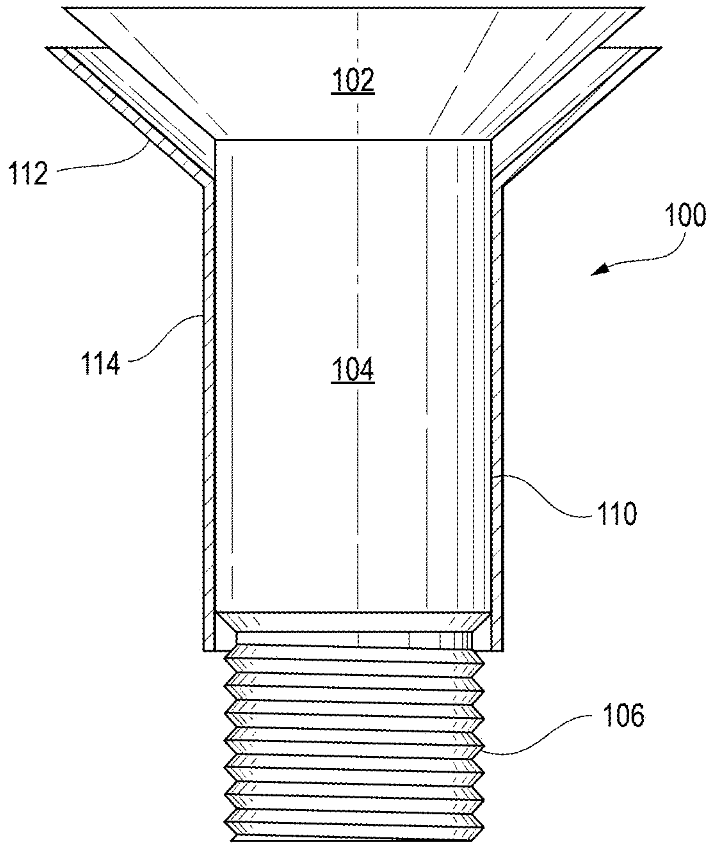
FIG. 8 is another alternative embodiment of a fastener constructed in accordance with a method of this disclosure.

In the above described method examples, the fasteners 10 and 80 have been sleeveless fasteners. Other types of fasteners 80 may also be used with methods of this disclosure. For example, FIG. 8 depicts a sleeved fastener 100, with a sleeve 110 that frictionally engages the shank portion 104 of the fastener. Conductivity between the sleeve and shank portion can be effectively assured by the interference fit between the interior of the sleeve and the exterior of the shank. However, in this case the exterior of the sleeve 110 may be treated with the same conductive coating 90, as described above in reference to the fastener 80. Alternatively, a conductive gap filler 50 can be applied to the sidewalls of the holes into which the sleeved fastener 100 is installed, similar to the approach described above in reference to the fastener 10. In the example of FIG. 8, however, optimal effectiveness will be achieved if the exterior tapered head portion 112 of the sleeve 110, as well as the exterior shank portion 114 of the sleeve 110, are both provided with the conductive coating. Alternatively, conductive gap filler can be used.

Figure 9:
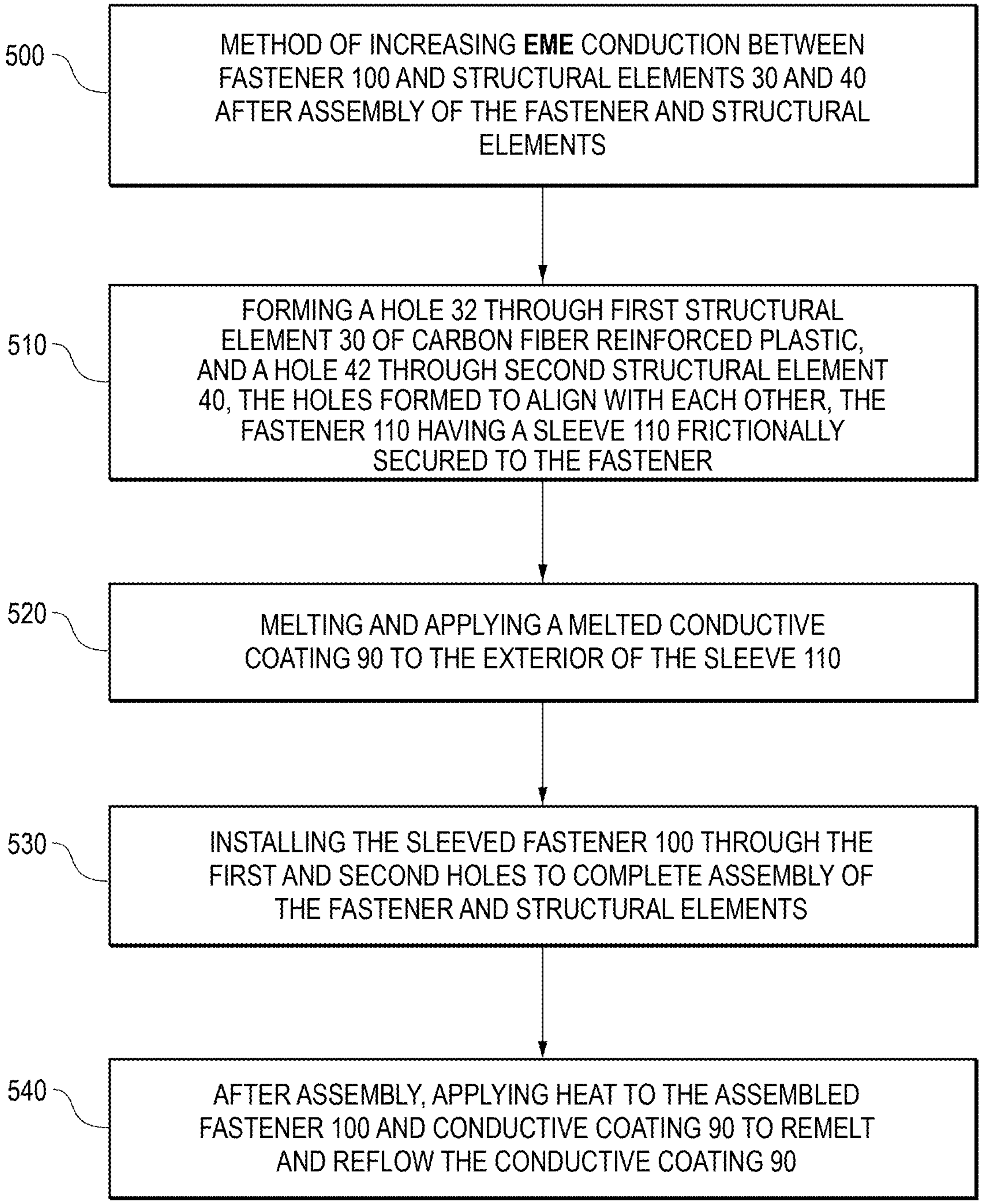
FIG. 9 is a third Flowchart describing yet another of the disclosed methods.

Consistent with the description of FIG. 8, FIG. 9 is a flowchart that depicts yet another method 500 of increasing EME conduction between the described sleeved fastener 100 that includes the sleeve 110 (FIG. 8) and the pair of structural elements 30, 40 (FIG. 2) after assembly of those components. The method 500 further includes applying the fastener to the pair of structural elements, at least one of which is formed of carbon fiber reinforced plastic. The method includes: a) 510: forming a first hole 32 through the first structural element 30, and a second hole 42 through the second structural element 40, each of the holes being formed to align with the other, each of the holes defining sidewalls 34; b) 520: melting and applying a conductive coating 90 to the exterior portions 112 and 114 of the sleeve 110; c) 530: installing the coated sleeve portions through the first and second holes to complete the assembly of all components; and d) 540: after the assembly, applying heat to the fastener 100 sufficient to remelt and reflow the conductive coating 90. The method 500 can be effective, as the above-described methods 300 and 400, to reduce voids and discontinuities between the sleeve 110 and the sidewalls 34 within the remelted and reflowed conductive coating 90, which can increase EME conductivity.

Methods Using Blind Fasteners

Figure 10:
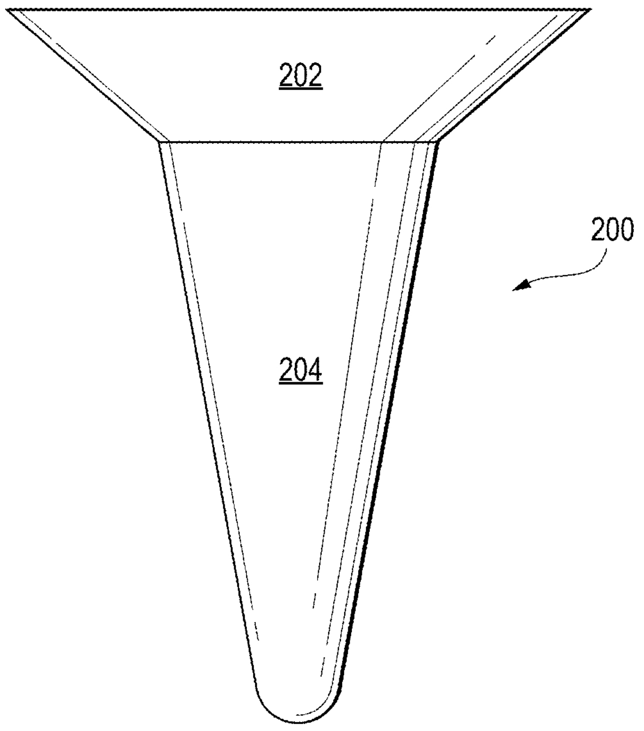
FIG. 10 is another alternative embodiment of a fastener constructed in accordance with a method of this disclosure.

Finally, in reference to FIG. 10, a blind fastener 200, commonly known as a one-sided fastener, is another type of fastener that may be suitable for use in the conductive fastening assembly 70 (FIG. 4). The blind fastener includes a head 202 and a shank portion 204, as shown, and is most often used in structural elements formed of two thin layers. As such, such fastener may be inserted into the holes 32, 42 of a structural assembly 70, so as to engage the assembly from just one side, without a need to access the opposite side of the assembly, as would be required to secure a nut or collar onto the end of a fastener having a threaded end.

Blind fasteners are also constructed from metallic materials of the types described above, including titanium, stainless steel, aluminum, and their alloys. The circumferential exterior of the tapered head 202 as well as the shank portion 204 can be treated with a conductive coating, as described above. Alternatively, a conductive gap filler can be applied to sidewalls of the holes into which blind fasteners are to be installed, as also described above.

Although various methods have been disclosed for using conductive gap fillers and/or conductive coatings to enhance EME characteristics of fasteners 10, 80, 100, and 200 employed to secure layers, with at least one layer including a CFRP material, modifications of the disclosed methods may occur to those skilled in the art. Thus, the present disclosure, including any such modifications, will herein be limited only by the scope of the appended claims.

Clauses

Clause 1. A method of increasing EME conduction between a fastener and at least two structural elements secured together by the fastener after assembly of the fastener and the structural elements, at least one of the structural elements formed of carbon fiber reinforced plastic, and the fastener including a shank portion; the method comprising:

a) forming a first hole through a first structural element and a second hole through a second structural element, each of the first hole and the second hole defining sidewalls;
b) applying a melted conductive gap filler to the sidewalls of each of the holes;
c) installing the shank portion of the fastener through the first and second holes to complete the assembly;
d) after assembly, applying heat to the fastener and the conductive gap filler sufficiently to melt and reflow the conductive gap filler.

Clause 2. The method of Clause 1, wherein the at least one of the structural elements formed of carbon fiber reinforced plastic is a matrix comprised of carbon fibers and plastic resin.

Clause 3. The method of Clauses 1 or 2, wherein the conductive gap filler is applied to the sidewalls as a heated paste that hardens into a solid mass when cooled.

Clause 4. The method of Clauses 1-3, wherein the conductive gap filler is of a conductive metal including combinations of indium, tin, and zinc.

Clause 5. The method of Clauses 1-4, wherein the fastener includes a shank portion, a head and a threaded end, the shank portion extending between and integral to the head and threaded end, wherein a nut engages the threaded end, and whereby the fastener, with the head and the nut holding the shank portion in tension, secures together the at least two structural elements.

Clause 6. The method of Clauses 1-5, wherein the first and second holes are pre-formed.

Clause 7. The method of Clauses 1-6, wherein the structural elements comprise parallel layers.

Clause 8. The method of Clauses 1-7, wherein the conductive gap filler is a conductive metal comprising 100% indium.

Clause 9. A method of increasing EME conduction between a fastener and at least two structural elements secured together by the fastener after assembly of the fastener and the structural elements, at least one of the structural elements formed of carbon fiber reinforced plastic, and the fastener including a shank portion; the method including:

a) forming a first hole through a first structural element and a second hole through a second structural element, each of the first hole and the second hole defining sidewalls;
b) melting and applying a conductive coating to the shank portion of the fastener to form a coated shank portion;
c) installing the coated shank portion of the fastener through the first and second holes to complete the assembly; and
d) after assembly, applying heat to the fastener sufficiently to remelt and reflow the conductive coating.

Clause 10. The method of Clause 9, wherein the at least one of the structural elements formed of carbon fiber reinforced plastic is a matrix comprised of carbon fibers and plastic resin.

Clause 11. The method of Clauses 9-10, wherein heat is applied by induction applied directly to the fastener.

Clause 12. The method of Clauses 9-11, wherein the conductive coating is formed of a conductive metal including combinations of indium, tin, and zinc.

Clause 13. The method of Clauses 9-12, wherein the fastener includes a shank portion, a head and a threaded end, the shank portion extending between and integral to the head and the threaded end, and wherein a nut engages the threaded end, whereby the fastener secures together the at least two structural elements, with the head and the nut holding the shank portion in tension.

Clause 14. The method of Clauses 9-13, wherein the structural elements comprise parallel layers.

Clause 15. The method of Clauses 9-14, wherein the first and second holes are pre-formed.

Clause 16. A method of increasing EME conduction between a fastener and at least two structural elements secured together by the fastener after assembly of the fastener and the structural elements, and at least one of the structural elements formed of carbon fiber reinforced plastic, the fastener having a shank portion, the fastener also including a cylindrical sleeve having an interior portion frictionally fixed to the shank; the method including:

a) forming a first hole through a first structural element and a second hole through a second structural element, each of the first hole and the second hole defining sidewalls;
b) melting and applying a conductive coating to an exterior portion of the sleeve;
c) installing the sleeve and shank portions of the fastener through the first and second holes to complete the assembly; and
d) after assembly, applying heat to the fastener sufficient to remelt and reflow the conductive coating.

Clause 17. The method of Clause 16, wherein the coating is applied to the sleeve as a liquid that hardens into a solid mass when cooled.

Clause 18. The method of Clauses 16-17, wherein the structural elements comprise parallel layers.

Clause 19. The method of Clauses 16-18, wherein heat is applied by induction applied directly to the fastener.

Clause 20. The method of Clauses 16-19, wherein the conductive coating is a metal comprising 100% indium.

What is claimed is:

1. A method of increasing EME conduction between a fastener and at least two structural elements secured together by the fastener after assembly of the fastener and the structural elements, at least one of the structural elements formed of carbon fiber reinforced plastic, and the fastener including a shank portion; the method comprising:

a) forming a first hole through a first structural element and a second hole through a second structural element, each of the first hole and the second hole defining sidewalls;
b) applying a melted conductive gap filler to the sidewalls of each of the holes;
c) installing the shank portion of the fastener through the first and second holes to complete the assembly; and
d) after assembly, applying heat to the fastener and the conductive gap filler sufficiently to remelt and reflow the conductive gap filler.

2. The method of claim 1, wherein the at least one of the at least two structural elements formed of carbon fiber reinforced plastic is a matrix comprised of carbon fibers and plastic resin.

3. The method of claim 1, wherein the conductive gap filler is applied to the sidewalls as a heated paste that hardens into a solid mass when cooled.

4. The method of claim 1, wherein the conductive gap filler is of a conductive metal including combinations of indium, tin, and zinc.

5. The method of claim 1, wherein the fastener further includes a head and a threaded end, the shank portion extending between and integral to the head and threaded end, wherein a nut engages the threaded end, and whereby the fastener, with the head and the nut holding the shank portion in tension, secures together the at least two structural elements.

6. The method of claim 1, wherein the first and second holes are pre-formed.

7. The method of claim 1, wherein the structural elements comprise parallel layers.

8. The method of claim 1, wherein the conductive gap filler is a conductive metal comprising 100% indium.

9. A method of increasing EME conduction between a fastener and at least two structural elements secured together by the fastener after assembly of the fastener and the structural elements, at least one of the structural elements formed of carbon fiber reinforced plastic, and the fastener including a shank portion; the method including:

a) forming a first hole through a first structural element and a second hole through a second structural element, each of the first hole and the second hole defining sidewalls;
b) melting and applying a conductive coating to the shank portion of the fastener to form a coated shank portion;
c) installing the coated shank portion of the fastener through the first and second holes to complete the assembly; and
d) after assembly, applying heat to the fastener sufficiently to remelt and reflow the conductive coating.

10. The method of claim 9, wherein the at least one of the at least two structural elements formed of carbon fiber reinforced plastic is a matrix comprised of carbon fibers and plastic resin.

11. The method of claim 9, wherein heat is applied by induction applied directly to the fastener.

12. The method of claim 9, wherein the conductive coating is formed of a conductive metal including combinations of indium, tin, and zinc.

13. The method of claim 9, wherein the fastener further includes a head and a threaded end, the shank portion extending between and integral to the head and the threaded end, and wherein a nut engages the threaded end, whereby the fastener secures together the at least two structural elements, with the head and the nut holding the shank portion in tension.

14. The method of claim 9, wherein the structural elements comprise parallel layers.

15. The method of claim 9, wherein the first and second holes are pre-formed.

16. A method of increasing EME conduction between a fastener and at least two structural elements secured together by the fastener after assembly of the fastener and the structural elements, and at least one of the structural elements formed of carbon fiber reinforced plastic, the fastener having a shank portion, the fastener also including a cylindrical sleeve having an interior portion frictionally fixed to the shank portion; the method including:

a) forming a first hole through a first structural element and a second hole through a second structural element, each of the first hole and the second hole defining sidewalls;

b) melting and applying a conductive coating to an exterior portion of the cylindrical sleeve;

c) installing the cylindrical sleeve and the shank portion of the fastener through the first and second holes to complete the assembly; and d) after assembly, applying heat to the fastener sufficient to remelt and reflow the conductive coating.

17. The method of claim 16, wherein the coating is applied to the cylindrical sleeve as a liquid that hardens into a solid mass when cooled.

18. The method of claim 16, wherein the structural elements comprise parallel layers.

19. The method of claim 16, wherein heat is applied by induction applied directly to the fastener.

20. The method of claim 16, wherein the conductive coating is a metal comprising 100% indium.

* * * * *